United States Patent Office 3,120,679
Patented Feb. 11, 1964

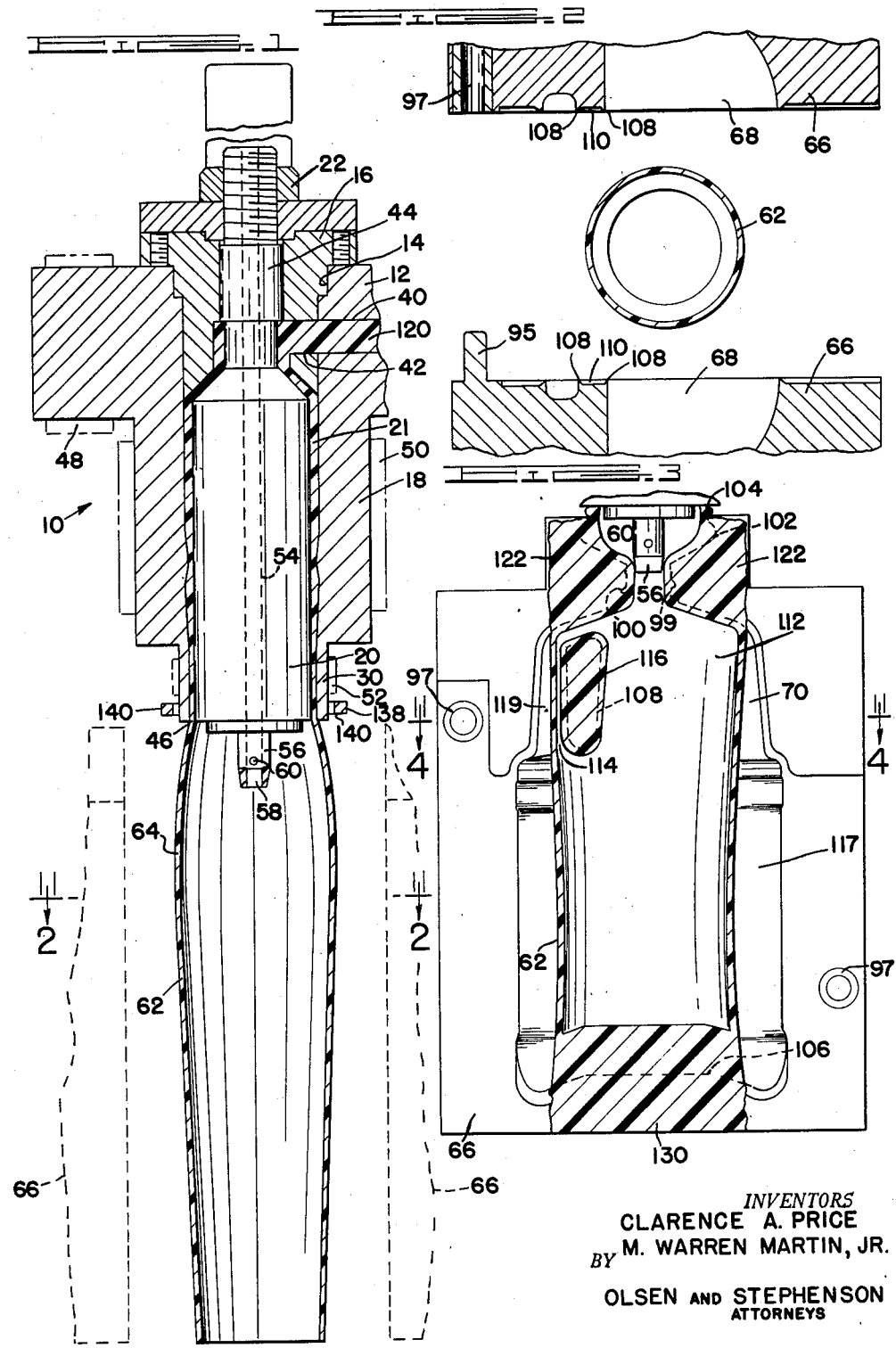

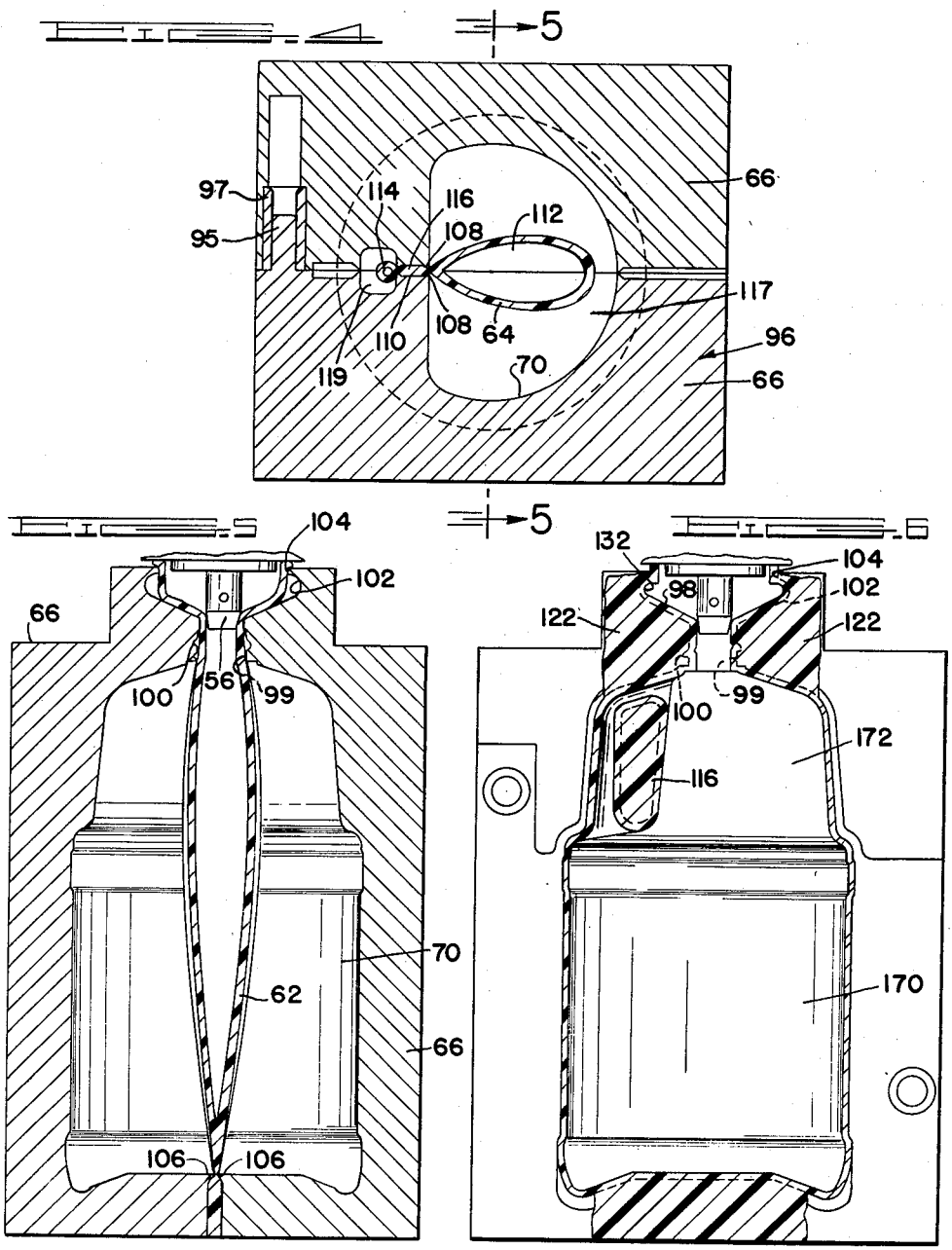

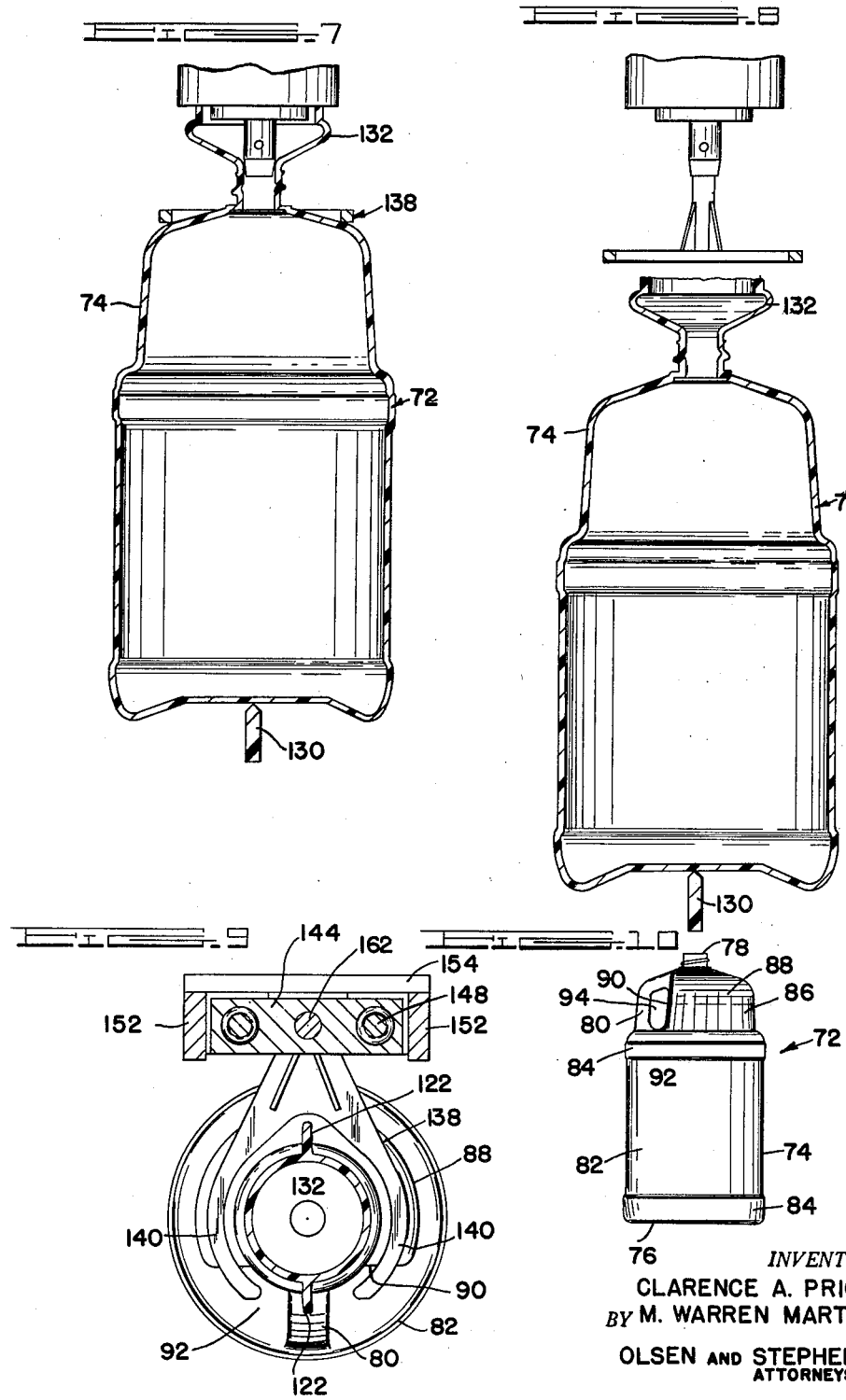

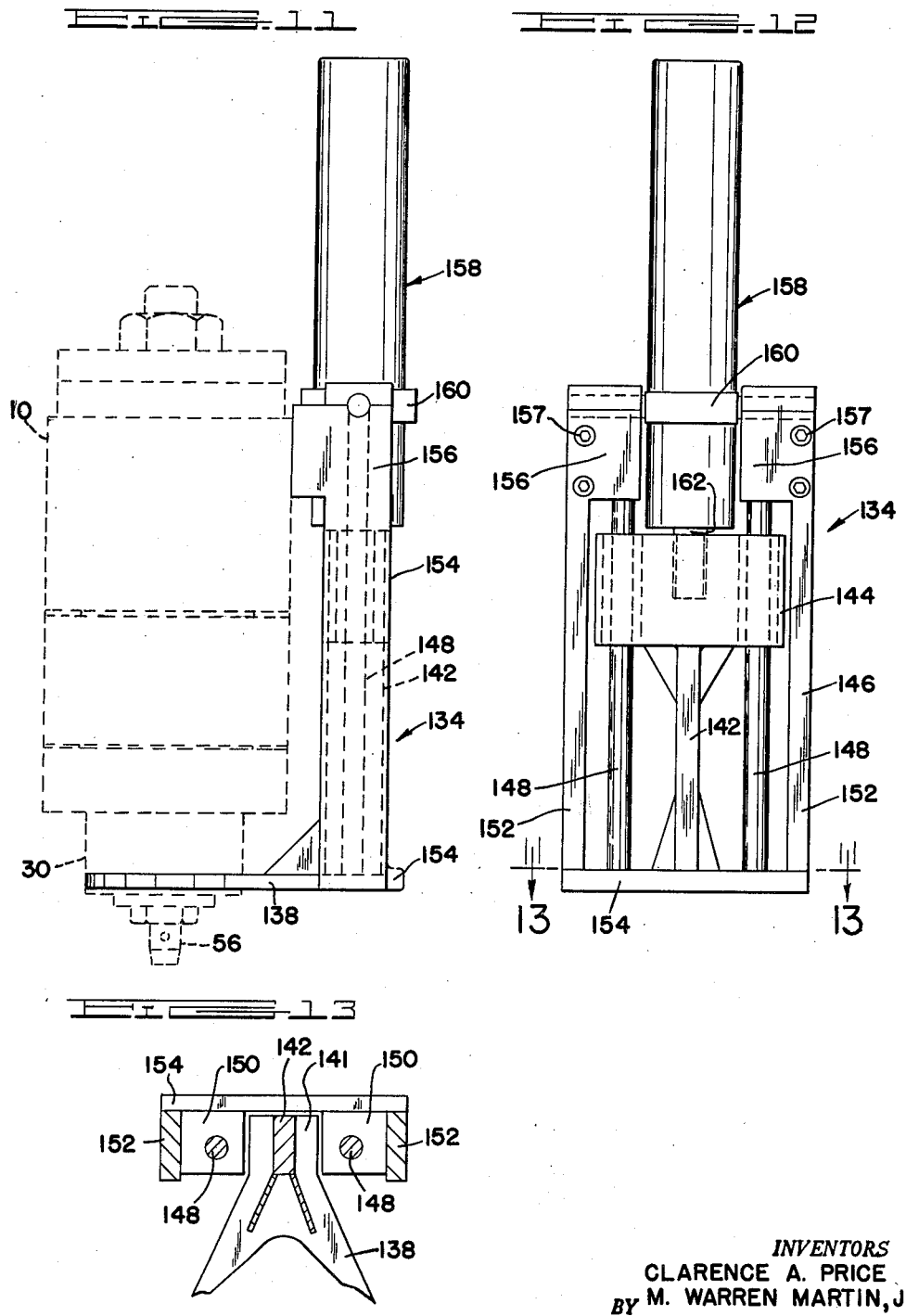

3,120,679
PLASTIC BOTTLE AND METHOD AND APPARATUS FOR MAKING SAME
Clarence A. Price, Ann Arbor, and Merritt Warren Martin, Jr., Saline, Mich., assignors to Hoover Ball and Bearing Company, Ann Arbor, Mich., a corporation of Michigan
Filed May 16, 1961, Ser. No. 110,501
8 Claims. (Cl. 18—5)

This invention relates generally to the art of blow molding thermoplastic resins which are rigid at normal temperatures but which are capable of deformation under the influence of heat and pressure, and more particularly to a hollow handled bottle and an improved apparatus and method for blow molding such a bottle.

In the blow molding of bottles and like containers from plastic material, a bottle having a hollow handle is desirable because it makes it possible to provide a large handle which is light in weight and requires a minimum amount of material thereby reducing the cost of the bottle. For this reason it is also desirable to provide a molding apparatus and method which makes it possible to blow mold a bottle of this type with a minimum amount of raw material. It is an object of this invention to provide an improved bottle having a hollow handle and an improved apparatus and process for blow molding such a bottle.

In the method and apparatus of this invention a downwardly extending tubular parison of plastic in heated semi-fluid condition is surrounded by a mold cavity having a main bottle portion and a communicating handle portion at one side of the main portion. The lower end of the parison is closed by the mold and air under pressure is introduced into the upper end of the parison so as to blow it into conformity with the mold cavity. In order to assure a hollow handle it is essential that when the mold which forms the mold cavity is closed it pinches and welds a portion of the parison so as to divide this portion into radially spaced chambers, without closing either chamber since both chambers must be capable of expansion to form the hollow bottle and hollow handle. In order to accomplish this the portion of the parison which is utilized to form the handle must be sufficiently large such that when it is pinched it will form the two necessary chambers. However, a large diameter parison is undesirable because it necessarily involves the use of an increased amount of raw material, since the parison must be of a certain thickness or it will pull apart during its formation. In the method and apparatus of this invention an extrusion die having an annular opening is provided and the plastic is extruded under pressure downwardly through the opening so that it bulbs out as it leaves the opening to thereby obtain a parison of a diameter greater than the diameter of the die opening. As the parison cools and stretches itself out under the influence of its own weight it decreases in diameter but the upper portion adjacent the extrusion die remains in a bulbed-out shape and is thus of an increased diameter. The handle on the bottle is located so that the portion of the mold cavity in which the handle is formed is located in horizontal alignment with the bulbed-out portion of the parison thereby utilizing the bulbing of the parison to enable the formation of the bottle with the hollow handle from what is considered a minimum amount of material taking into account the thickness required in the bottle for strength purposes.

A further object of this invention therefore is to provide an improved method and apparatus for blow molding bottles having hollow handles in which a minimum amount of raw material is required.

Another object of this invention is to provide an improved method and apparatus for blow molding hollow members in which the molded member is cleanly stripped from the plastic in the die at the conclusion of the molding operation.

Still another object of this invention is to provide improved apparatus for stripping the completed molded article from the extrusion die.

Further objects, features and advantages of this invention will become apparent from a consideration of the following description, the appended claims, and the accompanying drawing in which:

FIGURE 1 is a longitudinal sectional view of the die head structure in the blow molding apparatus of this invention, illustrating the shape of a parison formed by extruding plastic in a heated semi-fluid condition through the die head structure and showing the mold sections on opposite sides of the parison in broken lines;

FIGURE 2 is a transverse sectional view of the parison and the mold sections on opposite sides thereof prior to closing of the mold sections on the parison, as seen from the line 2—2 in FIG. 1 and rotated 90°;

FIGURE 3 is a vertical sectional view through the parison and the mold after the mold has closed on the parison and prior to the supply of any blowing fluid to the parison;

FIGURE 4 is a transverse sectional view of the parison and the mold, illustrated similarly to FIG. 2, showing the mold closed, and looking substantially along the line 4—4 in FIG. 3;

FIGURE 5 is a longitudinal sectional view looking substantially along the line 5—5 in FIG. 4;

FIGURE 6 is a vertical sectional view through the mold and the parison, illustrated similarly to FIG. 3, after the parison has been blown into conformity with the mold cavity;

FIGURE 7 is a vertical sectional view of the bottle of this invention showing the bottle suspended from the die head structure after the mold has been opened and showing the stripper member which removes the bottle from the die head in a downwardly moved position engaging the top side of the bottle;

FIGURE 8 is a vertical sectional view of the blown bottle of this invention and the die head structure showing the stripper member in its working position and showing the bottle stripped from the die head;

FIGURE 9 is a transverse sectional view of the stripper mechanism in the apparatus of this invention;

FIGURE 10 is a reduced side elevational view of the bottle of this invention after the flash has been trimmed therefrom;

FIGURE 11 is a side view of the stripper mechanism of this invention illustrating the mechanism attached to the die head which is shown in broken lines;

FIGURE 12 is a rear elevational view of the stripper mechanism shown in FIG. 11; and FIGURE 13 is a transverse sectional view of the stripper member looking substantially along the line 13—13 in FIG. 12.

With reference to the drawing, the blow molding apparatus of this invention is illustrated in FIG. 1 as including a die head 10 which consists of a body member 12 having an opening 14 in which a cylinder member 16 is supported so that it extends upwardly from the body member 12. A tubular sleeve member 18 extends downwardly from the body member 12 and is in coaxial alignment with the opening 14. A mandrel 20 extends upwardly through the sleeve member 18 and the cylinder 16 and is supported on the cylinder 16 by a nut 22 which is threaded onto the upper end of the mandrel 20. The mandrel 20 is positioned in a predetermined spaced relation with the sleeve 18 to provide an annular passage 21 between the mandrel 20 and the sleeve 18. The sleeve 18 terminates at its lower end in an annular die member 30 which encircles the mandrel 20 and is of a reduced external diameter relative to the sleeve 18.

The body member 12 has a plastic supply passage 40 formed therein which communicates with any suitable source of heated plastic in a semi-fluid condition which is capable of being blown or expanded into conformity with a mold cavity, such as the usual screw conveyor (not shown) in which the plastic is heated. The passage 40 communicates wiht a radial opening 42 in the cylinder 16 so that plastic from the supply passage 40 can flow into the annular space between the mandrel 20 and the cylinder 16. A portion 44 of the mandrel 20 fits tightly within the cylinder 16 at a position above the passage 42 to prevent any flow of plastic upwardly from the passage 42. Plastic flowing into the passage 42 flows downwardly through the passage 21 between the mandrel 20 and the sleeve 18 and then downwardly between the die member 30 and the mandrel 20 so that it issues from the annular opening 46 at the lower end of the die 30 in a tubular form. By virtue of the fact that the internal area of the die ring 30 is greater than the external area of the mandrel 20 the frictional force on the outer surface of the tube of plastic issuing from the opening 46 is greater than the frictional force on the inner surface. Consequently, the plastic travels faster on the inside of the tube and thus tends to bulb outwardly as shown in FIG. 1.

The plastic which is forced into the passage 40 is in a heated semi-fluid condition and is maintained in this condition while in the die head 10 by heater bands 48, only one of whch is shown, on the member 12, a heater band 50 which encircles the sleeve 18 and a heater band 52 which encircles the die member 30. The mandrel 20 tends to retain the heat which it receives from the plastic so that it is maintained at a higher temperature than the die member 30. This heating differential on the inner and outer surfaces of the tube of plastic in the die head 10 also affects the tendency of the plastic to bulb outwardly as shown in FIG. 1, since the hotter plastic is more fluid and thus tends to travel faster. The heater band 52 is thus preferably independently controlled to insure the desired bulbing of the parison 62.

The mandrel 20 is formed with an axial passage 54 which is connected at its upper end with a source of air, or other suitable gas, under pressure. A nozzle member 56 on the lower end of the mandrel 20 projects downwardly therefrom and communicates with the passage 54. The nozzle 56 has a downwardly directed discharge orifice 58 and a plurality of transversely directed discharge orifices 60 for a purpose to appear presently.

It can thus be seen that the die head 10 has a downwardly directed annular opening 46 formed therein which is disposed radially outwardly of the nozzle 58 and is supplied with plastic in a semi-fluid heated condition so that when the plastic travels downwardly out of the die opening 46, a tubular parison or body 62 is formed, as illustrated in FIG. 1. By virtue of the fact that the external area of the mandrel 20 adjacent the opening 46 is less than the internal area of the die member 30 adjacent the opening 46, and the fact that the mandrel 20 is at a higher temperautre than the die member 30, the plastic moving downwardly off the mandrel 20 is moving faster than the plastic moving downwardly off the die member 30 so that the parison 62 bulbs outwardly as it emerges from the opening 46. As the extrusion of the parison 62 continues, the lower end of the parison progressively decreases in diameter or necks down, so that the parison is of substantially the shape shown in FIG. 1, namely, having a portion 64 adjacent its upper end which is bulbed outwardly to a diameter greater than the diameter of the die opening 46. This bulbed out portion 64 of the parison 62 is utilized to facilitate the formation of the hollow handle on the bottle of this invention in a manner to be hereinafter described.

Mounted on opposite sides of the parison 62, at a position below the die opening 46, are a pair of mold sections 66 (FIG. 2). Each of the mold sections 66 is formed with a recess 68 so that when the mold sections 66 are moved into engagement as shown in FIG. 4, they form a complete mold 96 in which the recess 68 cooperates to form a mold cavity 70 which is of a shape to form the bottle of this invention, indicated generally at 72 in FIG. 10. As illustrated in FIG. 10, the bottle 72 consists of an upright hollow body 74 having a bottom wall 76, an externally threaded neck 78 at its upper end and a hollow handle 80 located on one side of the body 74. The body 74 is shaped to provide a lower annular portion 82 having enlarged ribs 84 at its upper and lower ends for appearance purposes, and an upper portion 86 which is of a reduced diameter and height relative to the lower portion 82. The upper portion 86 has a circular side wall 88 the ends of which are connected by a relatively straight side wall 90. The hollow handle 80 is connected at its lower end to a top wall 92 formed on the lower portion 82 and extended inwardly from one side thereof to the lower end of the upper portion side wall 90. The upper portion of the hollow handle 80 is connected to the side wall 90 at a position adjacent the neck 78. A handle opening 94 separates the handle 80 from the side wall 90.

The bottle 72 is thus provided with a handle 80 which is hollow and which communicates at its ends with the interior of the bottle 72. The handle 80 is within the upwardly extended dimensional confines of the lower bottle portion 82 and thus does not extend the transverse dimension of the bottle 72. The handle 80 is also large enough to provide for manual gripping thereof with several fingers to facilitate manual tipping of the bottle 72 to discharge the bottle contents.

The mold sections 66 are formed with mating pairs of pins 95 and bushings 97, only one pair of which are shown, which are positioned in horizontal alignment and which telescope into interfitting engagement when the mold sections 66 are moved horizontally into engagement with each other, as shown in FIG. 4, to form the mold 96 having the cavity 70. The mold 96 is also formed with an upwardly extending passage 98 which is axially aligned with the die opening 46. The lower end portion 99 of the passage 98 (FIGS. 3, 5 and 6) is of a reduced diameter relative to the die opening 46 and is formed in its side wall with helical grooves 100 shaped to form threads on the bottle neck 78 when plastic is forced into conformity with the grooves 100. The upper end portion 102 of the passage 98 is bulbed outwardly and upwardly from the upper end of the portion 99 and then extends inwardly so that the upper end 104 of the passage 98 corresponds in diameter substantially to the outer diameter of the die opening 46.

The lower ends of the mold sections 66 are formed with substantially horizontal lands or parison gripping portions 106 which engage opposite sides of the parison 62, during movement of the mold sections 66 toward each other, so as to move these opposite sides of the parison toward each other. When the mold sections 66 are moved into engagement, as shown in FIG. 5, there is a slight clearance between the lands 106 so that they operate to pinch and squeeze the lower end of the parison 62 so as to close the lower end of the parison, but not to sever the portion of the parison inside the mold from that outside the mold.

Horizontally aligned portions of the mold sections 66, which are also in horizontal alignment with the bulbed portion 64 of the parison 62, are provided with lands or parison gripping portions 108 which are of an irregular shape as shown in FIGS. 3 and 4. Each of the lands 108 is continuous and extends about a small recess 110 corresponding in shape to the shape of the handle opening 94. As shown in FIG. 4, when the mold sections 66 are engaged to form the mold 96 there is slight clearance between the lands 108 which engage opposite sides of the parison portion 64 and operate to pinch and weld a longitudinally extending strip 116 in this portion of the parison so as to divide the parison portion 64 into two radially spaced hollow chambers 112 and 114. The plastic in the welded strip is forced into the mating recesses 110 formed by the lands 108 and can be readily punched out when the bottle is removed from the mold because of the slight clearance between the lands 108. The parison chamber 112 is disposed in a portion 117 of the mold cavity 70 which corresponds to the shape of the bottle body 74 and the chamber 114 is disposed in a portion 119 of the mold cavity 70 which corresponds to the shape of the bottle handle 80 and communicates at its upper and lower ends with the cavity portion 117.

In the process of this invention for forming the bottle 72, plastic 120 in a heated semi-fluid condition is supplied to the die head passage 40 and is forced downwardly through the die opening 46 so as to form the tubular parison 62 which is of a length such that it extends downwardly a distance below the level of the lands 106 on the mold sections 66. Sufficient pressure is applied to the plastic 120 to force it downwardly out of the opening 46 so that the plastic bulbs outwardly to form the parison 62 of the illustrated shape, with the upper bulbed out portion 64. The band heater 52 for the die 30 is also adjusted to insure the desired bulbing of the parison 62.

When the parison 62 has reached the desired length, the supply of plastic to the passage 120 is discontinued and the mold sections 66, which are disposed in horizontal alignment with each other on transversely opposite sides of the parison 62 are moved horizontally toward each other. As the mold sections 66 move toward each other, the lands 108 engage transversely opposite sides of the bulbed portion 64 of the parison 62 and move these sides of the parison 62 toward each other. As these sides of the parison are moved toward each other, the parison is flattened out as shown in FIG. 4, so that it is transformed from a circular shape to a somewhat elliptical shape. As a result, the transverse dimension of the bulbed portion 64 of the parison 62 is increased and this increase is sufficient to position a portion of the parison in the mold cavity section 119 when the mold sections engage to form the mold 96. The lands 108 pinch and weld the intermediate strip 116 of the parison 62 so as to divide it into radially spaced hollow chambers 112 and 114. Concurrently with the pinching and welding of the strip 116 of the parison 62, the lands 106 engage opposite sides of the parison 62, adjacent the lower end thereof, so as to close the lower end of the parison as illustrated in FIG. 5.

The portions of the mold sections 96 on opposite sides of the lower portion 99 of the passage 98 in the mold 96, which is of a smaller diameter than the diameter of the upper end of the parison 62, and is in coaxial alignment with the die opening 46, also engage opposite sides of the parison and operate to pinch and weld sections 122 of the parison 62 on opposite sides of the passage 98.

Air under pressure is then supplied to the nozzle 56 which projects into the upper end of the passage 98 so that air issuing from the nozzle discharge orifice 58 flows into the mold cavity 70 and expands the parison 62 into conformity with the mold cavity 70 and the lower threaded portion 99 of the passage 98. Air discharged through the transverse nozzle discharge orifices 60 expands the upper end of the parison 62 into conformity with the upper bulbed out portion 102 of the passage 98 so as to reduce the thickness of the upper end of the parison 62 and cool the portion thereof adjacent the die opening 46.

After a time period permitting cooling of the expanded plastic on the mold sections 66, the mold sections 66 are moved horizontally away from each other so that the plastic which has been blown into conformity with the mold cavities, and is now of a shape corresponding to the final shape of the bottle 72 with some welded plastic or "flash" thereon, as shown in FIG. 7, is suspended from the plastic remaining in the die head 10. As shown in FIGS. 5 and 6, the nozzle 56 projects downwardly into the mold passage portion 99 so that when the parison is expanded the lower end of the nozzle 56 is closely adjacent and may even touch the plastic which conforms to the passage portion 99 and forms the neck 78 in the finished bottle 72. Consequently, when the mold sections 66 are moved apart so that the finished bottle can be removed from the mold 96, the nozzle 56 is engageable with the interior of the neck of the bottle to prevent the bottle from adhering to either of the mold sections 66.

After the mold sections 66 have been moved apart, the bottle 72 is suspended from the plastic remaining in the die opening 46 as shown in FIG. 7. At this time, the bottle has the welded plastic sections 122, which constitute "flash," extending from diametrically opposite sides of the upper end thereof, and a section of flash 130 on the lower end thereof, as well as having the annular bulbed-out section 132 on the upper end of the neck which is formed by the plastic which was blown into conformity with the upper end portion 102 of the passage 98. A stripper assembly, indicated generally at 134 in FIGS. 11 and 12, is mounted on the die head 10 for removing the bottle 72. The assembly 134 includes a stripper member 138 which is operable to apply a downward force to the upper end of the bottle body 74 so as to strip the bottle, with the excess flash thereon, from the plastic remaining in the die head opening 46. As shown in FIGS. 1 and 9, the stripper member 138 is of generally fork or U-shape, haivng transversely spaced arcuate leg portions 140 which extend forwardly from a base portion 141, and is arranged in a position in which it extends partially about the lower end of the die member 30 during molding of the bottle 72. The member 138 is mounted so that during downward movement it straddles the welded sections 122 so that the arcuate leg portions 140 are positioned on transversely opposite sides of the welded sections 122 for engagement with the top of the bottle body 74.

At a position to one side of the die member 30, the base portion 141 of the stripper member 138 is connected to the lower end of a push bar 142 (FIGS. 11 and 12) which is connected to its upper end to a block member 144. A supporting frame 146 for the stripper assembly 134 includes a pair of horizontally spaced upright guide rods 148 on which the block member 144 is slidably supported for up and down reciprocal movement. The guide rods 148 are secured at their lower ends to horizontally spaced plates 150 (FIG. 13) which are secured to the lower ends of upright side frame members 152 which form a part of the frame 146. A bottom frame member 154 is secured to the lower ends of the side frame members 152 and to the plates 150. At their upper ends, the guide rods 148 are supported on inward extensions 156 of the side frame members 152 which are secured to the die head 10 by bolts 157. A cylinder assembly 158, which is preferably air operated but which may be operated by any suitable fluid, is secured to a clamp 160 supported by the side frame extensions 156. The cylinder assembly 158 includes a piston rod 162 which extends downwardly and is secured to the block member 144. As a result, on actuation of the cylinder assembly 158 to move the piston rod 162 downwardly, the block member 144 is moved downwardly on the guide rods 148 to in turn move the push bar 142 downwardly so as to move the stripper member 138 downwardly. The stroke of the cylinder assembly 158 is sufficiently long to provide for an initial engagement of the stripper member 138 with the top end of the bottle body 74, as shown in FIG. 7, and to then move the bottle 72 downwardly so as to separate the upper end of the bulbed out plastic section 132 from the plastic remaining in the die opening 46, as shown in FIG. 8. The cylinder assembly 158 operates to rapidly move the piston rod 162 downwardly to snap off the plastic section 132 from the plastic at the die opening 46 so as to prevent any tendency of the plastic to be withdrawn from the die opening 46.

As soon as the downward movement of the stripper member 138 has been completed, the cylinder assembly 158 acts to move the piston rod 162 upwardly to return the stripper member 138 to its position shown in FIG. 1 in which it extends partially about the lower end of the die member 30 and is above the die opening 46. In this position, the stripper member 138 cannot interfere with a subsequent molding operation at the die head 10.

The welded plastic strip 116 positioned between the bottle handle 80 and the bottle side wall 90 is readily removed from the bottle 72 because of the relatively sharp edges formed on the lands 108. This makes it possible to merely punch out the strip 115 so as to form the handle opening 94. The flash 139 on the lower end of the bottle 72 is likewise readily removed because of the relatively sharp edges formed on the lands 106. The welded sections 122 are similarly removed from the top of the bottle and the bulbed-out section 132 of flash is cut from the top end of the neck 73 so as to provide the finished bottle shown in FIG. 10. As illustrated in FIG. 10, the bottle 72 has a side wall which on one side of the bottle extends upwardly to a location intermediate the upper and lower ends of the bottle and thence inwardly and upwardly so as to form the intermediate top wall 92 and top side wall 98. The hollow handle 80 is attached to the side wall on this side of the bottle at the point where the side wall extends inwardly and is attached at its upper end to the side wall at the upper end of the bottle. Consequently, the handle 80 forms an integral part of the bottle and does not add to the overall horizontal or vertical dimensions of the bottle. Because of the fact that the handle 80 is hollow, it can be formed of a size which is readily held in the hand without requiring a large amount of plastic to form the handle. In addition, because it is hollow and communicates at its ends with the large bottom chamber 170 and the somewhat smaller upper chamber 172 formed in the bottle body 74, the handle 80 adds somewhat to the capacity of the bottle 72.

It will be understood that the plastic bottle and method and apparatus for making same which are herein disclosed and described are presented for purposes of explanation and illustration and are not intended to indicate limits of the invention, the scope of which is defined by the following claims.

What is claimed is:

1. In a blow molding machine for forming a plastic bottle having a hollow body and an integral hollow handle, an extrusion nozzle capable of forming a downwardly extending tubular parison when plastic in a molten semi-fluid condition is forced therethrough, a pair of mold sections adapted to be moved radially inwardly toward said parison from opposite sides thereof into engagement with each other, said molds being formed so that in their engaged positions they form a cavity having a pair of communicating hollow portions one of which corresponds to the shape of said bottle body and the other one of which corresponds to the shape of said handle, said cavity portions being separated intermediate the ends of the portion corresponding to the shape of said handle by lands on said mold sections located so that on movement of said mold sections toward each other said lands engage opposite sides of said parison and move said sides toward each other into engagement at a position to one side of the vertical axis of said parison so as to divide said parison into a pair of hollow body and handle sections spaced radially from each other and in communication with each other at the upper and lower ends of said handle section.

2. In a blow molding machine for forming a plastic bottle having a hollow body and an integral hollow handle, means providing a tubular parison of an expansible plastic material, a pair of mold sections adapted to be moved radially inwardly toward said parison from opposite sides thereof into engagement with each other, said mold sections being formed so that in their engaged positions they form a cavity having a pair of communicating hollow portions one of which corresponds to the shape of said bottle body and the other one of which corresponds to the shape of said handle, said cavity portions being separated intermediate the ends of the portion corresponding to the shape of said handle by lands on said mold sections located so that on movement of said mold sections toward each other said lands engage opposite sides of said parison and move said sides toward each other into engagement at a position to one side of the axis of said parison so as to divide said parison into a pair of separate hollow body and handle sections spaced radially from each other and in communication with each other at the ends of said handle section.

3. In the blow molding of a bottle having an open top end and a hollow handle on one side spaced a predetermined distance below said top end from plastic material in which an annular downwardly extending die of a predetermined diameter is provided, the process comprising the steps of forcing plastic in a heated semi-fluid condition downwardly through said die so that upon leaving the die said plastic bulbs outwardly for a predetermined distance below said die at least equal to the predetermined distance said handle is spaced below the top end of said bottle and forms a tubular parison of a length greater than the length of said bottle, surrounding said parison with a mold cavity of a shape corresponding to the desired final shape of said bottle concurrently with pinching opposite sides of said bulbed portion of the parison together at a position radially inwardly of the inner wall thereof so that said portion is provided with a pair of radially spaced passages which communicates at their upper and lower ends, and supplying a fluid under pressure to said passages whereby to expand said parison outwardly into conformity with said cavity.

4. In apparatus for blow molding a bottle having a neck opening at the upper end thereof and a side handle positioned a predetermined distance below and to one side of said opening, an extrusion die having an annular opening adapted to have heated plastic in a semi-fluid condition forced downwardly therethrough so as to form a downwardly extending tubular parison which is suspended at its upper end from said die and is bulbed outwardly from said die opening over a length of said parison at least equal to said predetermined distance, a plurality of mold sections mounted for movement radially of said parison into a position in engagement with each other to define a mold having a cavity therein corresponding to the shape of said bottle, said cavity having a main portion and a handle portion, first land means on said mold sections located between said cavity portions and movable toward each other from opposite sides of said parison into engagement with said opposite sides so as to pinch and weld a section of the bulbed portion of said parison to one side of the vertical axis thereof between said mold cavity portions and divide said parison into radially spaced hollow sections which communicate at the upper and lower ends of said welded section, second land means on said mold sections movable into engagement with opposite sides of said parison adjacent the lower end thereof so as to pinch and close the lower end of said parison on engagement of said mold sections, said mold having an upwardly extending passage in the top end thereof which is coaxial with said parison and communicates at its lower end with said cavity, said passage upwardly from the mold cavity being shaped so that it is progressively enlarged to a diameter larger than the diameter of said annular die opening and then progressively decreased so that at its upper end the diameter of said passage corresponds substantially to the diameter of said die opening, and means for injecting gas into said parison so as to expand it outwardly into conformity with said mold cavity and into conformity with said passage whereby to form a bottle having a welded section which is removable to form a handle opening and whereby to expand the parison adjacent the die opening to thereby cool and reduce the thickness of said portion to facilitate separation thereof from the plastic in the die.

5. In apparatus for blow molding a bottle having a neck opening at the upper end thereof and a side handle positioned a predetermined distance below and to one side of said opening, an extrusion die having an annular opening adapted to have heated plastic in a semi-fluid condition forced downwardly therethrough so as to form a downwardly extending tubular parison which is suspended at its upper end from said die and is bulbed outwardly from said die opening over a length of said parison at least equal to said predetermined distance, a plurality of mold sections mounted for movement radially of said parison into a position in engagement with each other to define a mold having a cavity therein corresponding to the shape of said bottle, said cavity having a main portion and a handle portion, first land means on said mold sections located between said cavity portions and movable toward each other from opposite sides of said parison into engagement with said opposite sides so as to pinch and weld a section of the bulbed portion of said parison to one side of the vertical axis thereof and divide said parison into radially spaced hollow sections which communicate at the upper and lower ends of said welded section, second land means on said mold sections movable into engagement with opposite sides of said parison adjacent the lower end thereof so as to pinch and close the lower end of said parison on engagement of said mold sections, and means for injecting gas into said parison so as to expand both of said spaced sections thereof outwardly into conformity with said mold cavity whereby to form a bottle having a hollow handle and a welded section which is removable to form a handle opening.

6. In apparatus for blow molding a hollow member, an extrusion die having an annular opening adapted to have heated plastic in a semi-fluid condition forced downwardly therethrough so as to form a downwardly extending tubular parison which is suspended at its upper end from said die, a plurality of mold sections mounted for movement radially of said parison into a position in engagement with each other to define a mold having a cavity therein corresponding to the shape of said member, said mold having an upwardly extending passage in the top end thereof which is coaxial with said parison and communicates at its lower end with said mold cavity, said passage being shaped so that intermediate its upper and lower ends it is of an enlarged diameter and is bulbed outwardly and at its upper end said passage is of a diameter corresponding substantially to the diameter of said die opening, means for injecting gas into said parison over the length thereof extending downwardly from said die opening so as to expand the parison outwardly into conformity with said mold cavity and into conformity with said passage whereby to form said hollow member and whereby to expand the parison adjacent the die opening to thereby cool and reduce the thicknes of said portion to facilitate separation thereof from the plastic in the die, and means for applying a downwardly directed force to the formed hollow member to break said hollow member at the upper end of said passage from the plastic in said die.

7. In a blow molding machine for forming a plastic bottle having a hollow body and an integral hollow handle, means providing a tubular parison of an expansible plastic material, a pair of mold sections adapted to be moved radially inwardly toward said parison from opposite sides therof into engagement with each other, said mold sections being formed so that in their engaged positions they form a cavity having a pair of communicating hollow portions one of which corresponds to the shape of said body and the other one of which corresponds to the shape of said handle, said cavity portions being separated between the ends of the portion corresponding to the shape of said handle by lands on said mold sections located so that on movement of said mold sections toward each other said lands engage opposite sides of said parison and move said sides toward each other into engagement at a position mostly to one side of the axis of said parison so as to divide said parison into a pair of hollow body and handle sections spaced radially from each other and in communication with each other at the ends of said handle section, and means for injecting fluid into said parison so as to expand it ouwardly into conformity with said mold cavity.

8. In a blow molding machine for forming a plastic bottle having a hollow body and an integral hollow handle, an extrusion nozzle capable of forming a downwardly extending tubular parison when plastic in a molten semifluid condition is forced therethrough, a pair of mold sections adapted to be moved radially inwardly toward said parison from opposite sides thereof into engagement with each other, said molds being formed so that in their engaged positions they form a cavity having a pair of communicating hollow portions one of which corresponds to the shape of said body and the other one of which corresponds to the shape of said handle, said cavity portions being separated intermediate the ends of the portion corresponding to the shape of said handle by lands on said mold sections located so that on movement of said mold sections toward each other said lands engage opposite sides of said parison and move said sides toward each other into engagement at a position mostly to one side of the vertical axis of said parison so as to pinch and weld a section of said parison and divide said parison into a pair of hollow body and handle sections spaced radially from each other and in communication with each other at the upper and lower ends of said pinched and welded parison section, and means for injecting fluid into said parison so as to expand it outwardly into conformity with said mold cavity whereby to form a bottle having said welded section which is removable to form a handle opening.

References Cited in the file of this patent

UNITED STATES PATENTS

| | | |
|---|---|---|
| 2,349,177 | Kopitke | May 16, 1944 |
| 2,597,558 | Bailey | May 20, 1952 |
| 2,724,860 | Strong | Nov. 29, 1955 |
| 2,836,319 | Pinsky et al. | May 27, 1958 |
| 2,854,691 | Strong | Oct. 7, 1958 |
| 2,928,120 | Leghorn | Mar. 15, 1960 |
| 2,951,264 | Bailey | Sept. 6, 1960 |
| 2,967,330 | Tommarchi | Jan. 10, 1961 |
| 2,975,473 | Hagen | Mar. 21, 1961 |
| 2,978,131 | Garvey | Apr. 4, 1961 |
| 2,984,865 | Mumford | May 23, 1961 |

FOREIGN PATENTS

| | | |
|---|---|---|
| 752,637 | Great Britain | July 11, 1956 |
| 1,030,004 | France | June 9, 1953 |